FOUR QUADRANT COMPUTER

Filed Sept. 16, 1955 3 Sheets-Sheet 1

INVENTOR.
BILLY E. DAVIS
BY G. D. O'Brien
ATTORNEY

INVENTOR.
BILLY E. DAVIS

BY [signature]

ATTORNEY

Jan. 12, 1960 B. E. DAVIS 2,920,828
FOUR QUADRANT COMPUTER
Filed Sept. 16, 1955 3 Sheets-Sheet 3
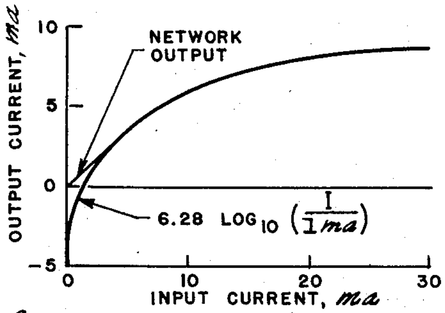
FIG. 7
FIG. 12
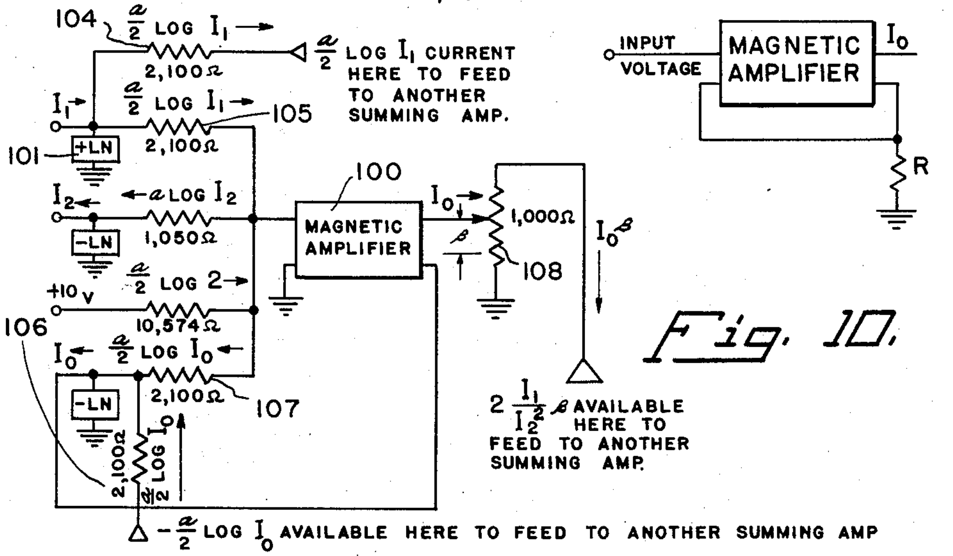
FIG. 10, FIG. 12
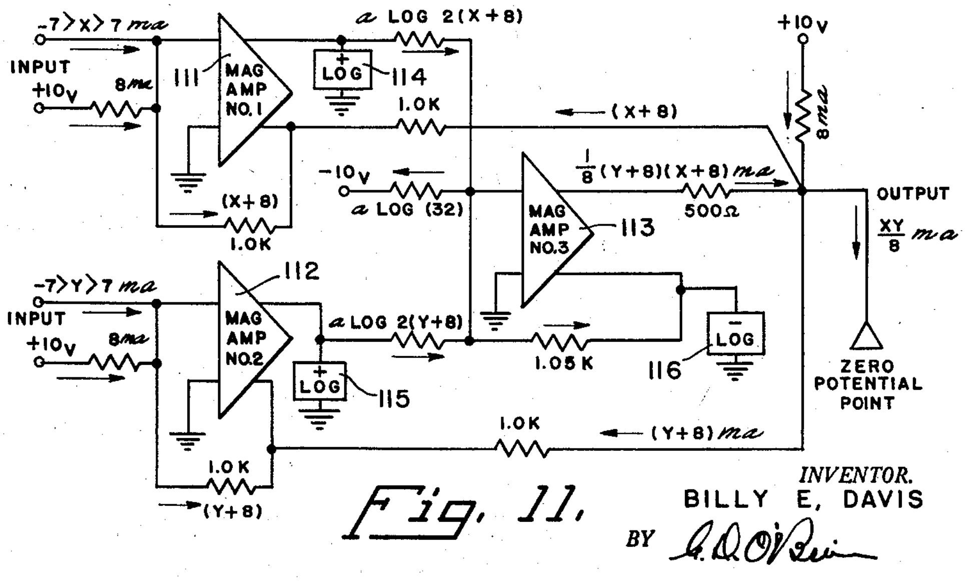
FIG. 11
INVENTOR.
BILLY E. DAVIS
BY [signature]
ATTORNEY

United States Patent Office 2,920,828

Patented Jan. 12, 1960

2,920,828

FOUR QUADRANT COMPUTER

Billy E. Davis, China Lake, Calif., assignor to the United States of America as represented by the Secretary of the Navy

Application September 16, 1955, Serial No. 534,898

3 Claims. (Cl. 235—194)

(Granted under Title 35, U.S. Code (1952), sec. 266)

The invention described herein may be manufactured and used by or for the Government of the United States of America for governmental purposes without the payment of any royalties thereon or therefor.

This invention relates to an analog computer technique using magnetic amplifiers and particularly to a four quadrant computer.

The foremost requirement to be met in the design of computers is that of providing adequate reliability of operation. Computers should have a mean life between failures of more than six months when operated under unfavorable environmental conditions. This degree of reliability is needed to insure that the equipment will inspire the user's confidence in its functional availability, and in keeping the maintenance load to a minimum. The complexity of the equations solved must be limited in accordance with the inherent reliability of the computer components. Conventional computer elements such as servos, with their vacuum tube amplifiers, moving parts, and potentiometers, have sufficiently low component reliability that only simple computers will meet the overall reliability requirements. On the other hand, computers with this degree of simplicity will inadequately meet many job requirements. Therefore, new computing techniques which have a higher inherent reliability factor per unit computing operation performed are necessary.

The computing techniques, of the present invention, described herein, provide a much higher reliability factor than conventional techniques, through the use of only magnetic amplifiers, metallic rectifiers, and precision resistors.

An object of the invention is to provide a four quadrant computer having a computational accuracy within one percent per operation.

Another object of the invention is to provide a computer having a high ratio of computing operations performed per unit volume or weight.

Another object is to provide a computer without vacuum tubes.

A further object of the invention is to provide a computing technique having a sufficiently short response time for a large class of applications.

A still further object is to provide a computer which has a high degree of accuracy and reliability, and low power consumption and heat dissipation.

Other objects and many of the attendant advantages of this invention will be readily appreciated as the same becomes understood by reference to the following detailed description when considered in connection with the accompanying drawings wherein:

Fig. 7 is an illustration showing the method of fitting a network output to a logarithmic curve;

Fig. 10 is a circuit illustrating some schemes used for interconnecting components to make up a computer;

Fig. 11 is a circuit diagram for the four quadrant multiplier;

Fig. 12 is a functional diagram of a buffer amplifier.

In the present invention, variables are represented by direct currents which flow either into, or out of, a ground potential point. A current flowing into ground represents a positive quantity, while a current flowing out of ground represents a negative quantity.

Figure 1:
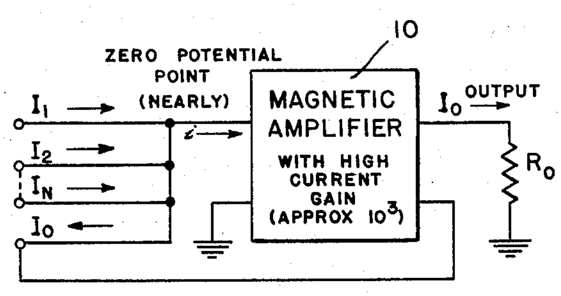
Fig. 1 shows a negative feedback circuit used for summing.

Algebraic sums are obtained by a negative current feedback circuit as shown in Fig. 1. A summation of currents flowing into the input terminal of magnetic amplifier 10 will give the following equation:

$$(1)\qquad i=I_1+I_2+\ .\ .\ .\ +I_n-I_o$$

or $$(2)\qquad I_o=I_1+I_2+\ .\ .\ .\ +I_n-i$$

If the steady state current gain of the magnetic amplifier is $10^3$, then $$(3)\qquad i=I_o\times 10^{-3}$$

and $$(4)\qquad I_o=(I_1+I_2+\ldots+I_n)(1+0.001)^{-1}$$

The output $I_o$ will then be within 0.1 percent of its theoretical value.

Figures 2, 3, 4:
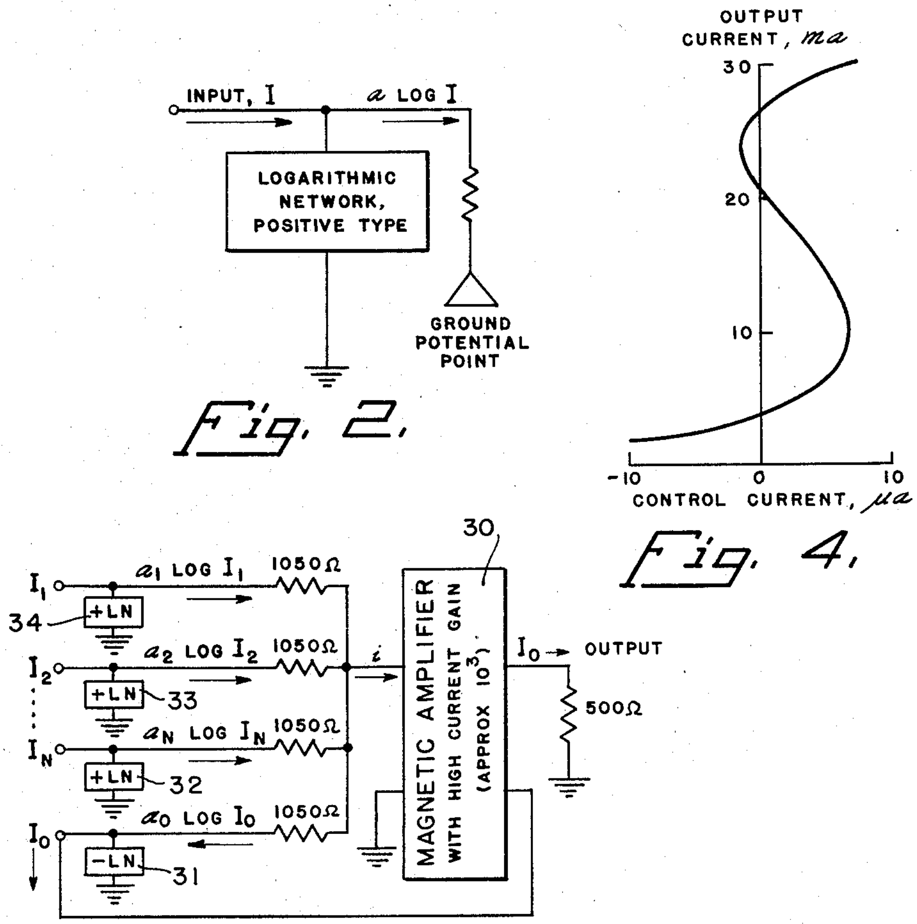
Fig. 2 is a functional diagram of a logarithmic network.
Fig. 3 is a block diagram of a computing scheme to sum logarithmic currents.
Fig. 4 is a typical transfer curve for the magnetic amplifiers, showing the current gain as infinite at three points.

Computation of products, quotients, roots, and powers is accomplished in a similar manner by using the magnetic amplifier 10 to sum currents that are proportional to the logarithms of the input currents. The logarithmic currents may be obtained by diode-resistance shaping networks, as indicated in Fig. 2. The logarithmic network indicated in Fig. 2 is a non-linear impedance, which is so designated that the load current is proportional to the logarithm of the input current. Both positive and negative types of networks are required. Externally, the negative network looks the same as the positive network shown in Fig. 2, except that the directions of the input and output currents are reversed.

A block diagram of a logarithmic analogue computer element is shown in Fig. 3. The circuit shown is the same as that used for summing (Fig. 1), except that the output lead, and each input lead, has a logarithmic network, 31, 32, 33 or 34, applied to it. Hence, since the magnetic amplifier 30 has a high current gain, its input current "$i$" will be small and the negative feedback action of the circuit will cause the logarithm of the output to equal the sum of the logarithms of the inputs. In Fig. 3, the output will then equal the product of the inputs, if the "$a$'s" are equal. If the $a$'s are not equal, each input will be raised to the power $(a_n/a_o)$, where $a_n$ is the coefficient of the logarithmic current obtained from the $n$th input. Any of the inputs may be made to be divisors rather than multipliers by using a negative logarithmic network instead of a positive one.

The principal requirement of the magnetic amplifier (Fig. 5) is that it must have a high current gain, since current drawn by its control coil 51 will cause a computing error. The gain is therefore adjusted to be infinite at three points on its operating curve, by using sufficient positive feedback. The transfer curve of a typical magnetic amplifier is shown in Fig. 4. This curve is representative of operation in a negative feedback circuit such as that of Fig. 1 or Fig. 3. The operation of such an amplifier in either of these negative feedback circuits is best understood by first noting that the output current $I_o$ is determined by the nature of the feedback circuit and the values of the inputs. For example, in Fig. 1, if the sum of the input currents $I_1 \ldots I_n$ is 24 milliamperes, the output will be held to be very close to this value. Hence, Fig. 4 should be viewed considering the output $I_o$ to be the independent variable. Then the input, *i*, is a single valued function of $I_o$, and its value is an indication of the deviation of the circuit operation from ideal.

The transfer characteristic of Fig. 4, therefore, is meaningful only when the amplifier is used in a negative feedback circuit. The negative feedback circuit makes such an arrangement stable, and keeps the response time small. It is seen from Fig. 4 that the computing error contributed by the magnetic amplifier varies from positive to negative, depending on the output current $I_o$. Hence, the average error will be considerably smaller than its maximum error.

Figure 5:
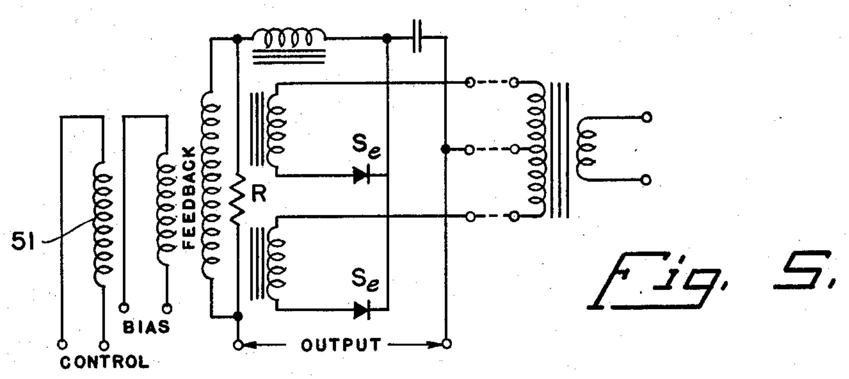
Fig. 5 is a schematic diagram of the magnetic amplifier circuit.

The error caused by the input current drawn by the magnetic amplifier 30 may be computed for the circuit of Fig. 3. Such an analysis will readily give, $$(5) \qquad I_o = b^{\frac{i}{a_o}} \overset{n}{\underset{j=1}{P\pi}} \left( I_j^{\frac{a_j}{a_o}} \right) = \left[ 1 + \frac{i}{a_o} \log_e b \right] \overset{n}{\underset{j=1}{P}} \left( I_j^{\frac{a_j}{a_o}} \right)$$

where *b* is the base of the logarithms, and the symbol "P" indicates that all quantities it operates on are to be multiplied together. The error in output current $I_o$ is seen to be the amount the square bracket term deviates from unity. This error is proportional to "*i*," and independent of the values of both the output and input currents. The magnetic amplifier circuit of Fig. 5 is designed for this application.

Figure 6:
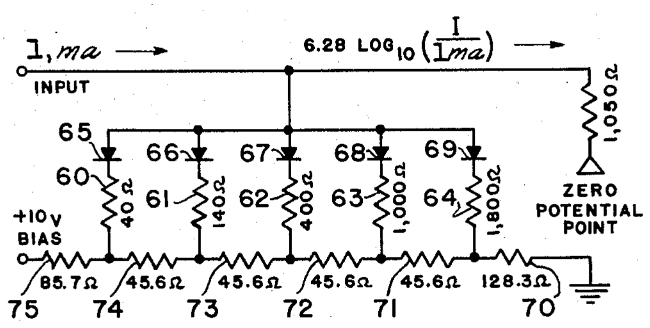
Fig. 6 illustrates a typical logarithmic network (positive type)

A typical circuit for a logarithmic network is shown in Fig. 6. It is made up of precision resistors 60, 61, 62, 63, 64, rectifiers 65, 66, 67, 68, 69, and bias resistors 70, 71, 72, 73, 74, 75; and its operation is as follows. When the input, I, is small, the rectifiers are all cut off and the output equals the input, as shown in Fig. 7. As I is increased, the rectifiers cut in sequentially, bleeding current to ground. As shown in Fig. 7, the residual, or output current is thus made to approximate a logarithmic curve for a 15:1 range of input currents (2–30 ma.). The network shown in Fig. 6 is termed a positive type. Negative networks are also required, as was previously pointed out. The negative networks differ from positive ones (Fig. 6) in the following respects; (*a*) the directions of the input and output currents are opposite from those for positive networks, (*b*) the rectifiers are inverted in the circuit, and (*c*) the bias voltage is made negative instead of positive. If the network diodes had "ideal" characteristics, the logarithmic curve would be approximated by a series of straight lines. The more gradual on-off transition experienced with real germanium actually reduces the fitting errors over those obtained with straight lines. Silicon junction diodes may also be used.

Figure 8:
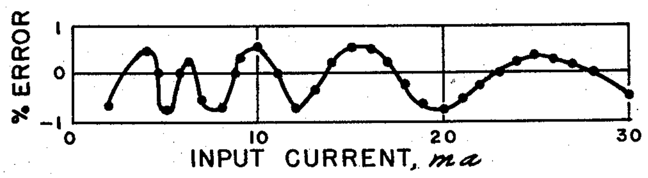
Fig. 8 is a curve showing the percent error, referred to the input, for a typical network.

The accuracy of fit, and the range of the input over which the fit is obtained, depends on the number of diodes used. A twelve diode network, for example, can be constructed having a maximum error of 0.1 percent at room temperature, for an input current range of 15:1. A network composed of five diodes, as in Fig. 6, gives acceptable accuracy, with a reasonable number of components. A typical error curve for such a five diode network is shown in Fig. 8. This curve shows the error, expressed as a percentage of the input, and plotted against the input current. The error is seen to be cyclic, with a maximum value of 0.8 percent.

The data given in Fig. 8 are typical of networks constructed according to the circuit in Fig. 6. The diodes used are preferably germanium, selected to have a back resistance at 75° C. greater than 200K at 20 volts, for example. The values given for the resistors in series with the diodes are approximate, as they must be individually matches to the diodes.

The temperature errors of a network are caused by variation of diode characteristics. A change in forward resistance of the diodes causes a change in slope of the line segments used in fitting the logarithmic curve. This factor is not too large, however, as its effect is diluted by the resistors 60, 61, 62, 63, 64 in series with the diodes 65, 66, 67, 68, 69. The drop in back resistance of the diodes at high temperatures permits an error current to flow from the 10 volt reference source into the load. This error is negligible at the highest output current, as all of the diodes are biased to be conducting. At low output currents, however, this error is appreciable, as all the diodes are biased to be non-conducting, and the excess back current from all the diodes causes an error. This effect must be compensated for, if the performance is not to be degraded at high temperatures, and low output currents.

Figure 9:
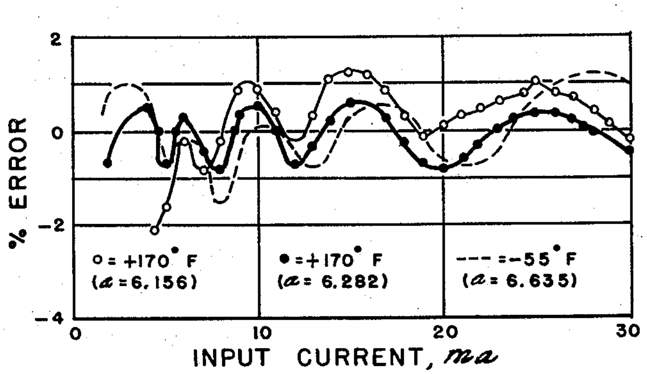
Fig. 9 is a curve showing Network Errors vs. Input Current, for three temperatures.

It is important, however, to recognize that if a network changes with temperature in such a way that its output is off by the same percentage at all inputs, no computing error will result. This is because such an error is equivalent to computing with a different base for the logarithms. It is only necessary under such circumstances, to locate all the networks together in a computer, so that they will experience the same temperature environment. Fig. 9 shows the temperature errors for an uncompensated network. Each curve represents deviation from the desired equation $I_o = a \log(I/1 \text{ ma.})$. Using $\log_{10}$, the values of the constant "*a*" given on the curves were chosen to minimize the errors at that temperature. The three curves, for three temperatures, each represent the error in fitting the most appropriate logarithmic curve for that temperature. It can be seen that, except for low outputs at high temperatures, the errors are less than 1.5 percent. Such errors as these are tolerable for some computers, particularly those where input currents less than 6 ma. are seldom used.

The two basic components previously described, the logarithmic network (Fig. 6) and the summing amplifier (Fig. 5), have sufficient versatility that they can be interconnected to solve rather complicated systems of equations. In order to do so, however, a number of special circuits must be utilized. The more important of these circuits are described below.

Fig. 10 illustrates some of the circuits used in interconnecting components to form a computer. In this example, half of the output of the logarithmic network 101 operating on the input $I_1$, is fed to the summing amplifier 100. The other half of this current is then available to feed to another summing circuit. The same arrangement is used to make available the logarithm of the output current $I_o$. By using this scheme, the logarithm of a quantity need be taken only once, and the current splitting circuit is used to supply the logarithm to other summing amplifiers. Two points that need to be kept in mind in applying this method are, (*a*) the parallel combination of the current splitting resistors 104 and 105, 106 and 107 must equal the design load value for the networks, and (*b*) the input terminal of a summing amplifier is within a few millivolts of ground potential, and for practical purposes can be considered as ground. It should be noted that a price in accuracy is paid for employment of this scheme. Equation 5 shows that splitting the load current in half doubles the error resulting from the current drawn by the magnetic amplifier (Fig. 5). On the other hand, the error caused by the input voltage of the magnetic amplifier is decreased.

A constant multiplier is introduced by feeding a constant current into the summing junction of the amplifier. For example, the output is multiplied by a factor of two by a resistor from a 10 volt reference source.

A mechanical input, $\beta$, is introduced by the simple means shown in the output circuit of Fig. 10. The potentiometer 108 is varied by the displacement $\beta$, and the output is clearly zero when $\beta$ is zero. The output when the potentiometer 108 is at the top is equal to $I_0$, and for intermediate positions is exactly proportional to the resistance from the arm of the potentiometer to ground.

The logarithmic method as described requires that the inputs always be of one sign. This restriction can usually be overcome by some means. The four quadrant multiplier can be constructed as shown in Fig. 11, for example. The circuit comprises magnetic amplifiers 111, 112 and 113 and logarithmic networks 114, 115 and 116. Input signals are applied to input amplifiers 111 and 112; the output of amplifier 111 is connected to logarithmic network 114, and the output of amplifier 112 is connected to logarithmic network 115. The logarithmic outputs of networks 114 and 115 are connected to the input of magnetic amplifier 113 and network 116 is connected to the feedback circuit of magnetic amplifier 113. In this circuit a constant is added to each of the two inputs, so that the sum will always be positive. After multiplying, the unwanted product terms are then substracted out.

Often, an electrical input to a computer is from a relatively high impedance source. In such cases, the magnetic amplifier previously described can be used as a buffer amplifier, as shown in Fig. 12. The summing amplifier can also be used as an accurate comparator when it is desired that a relay be closed when one variable becomes larger than another; the two variables are represented by currents, one flowing into and the other out of the summing junction of the amplifier. Then with no negative feedback connection, the amplifier output will go to its maximum value when the magnitude of the one input exceeds that of the other by more than 10 microamps., for example.

Constant, low impedance sources of both plus and minus 10 volts (by way of example) are required for biasing the networks (Fig. 6), and introducing constants into the computer (Fig. 11). These are satisfactorily provided by magnetic amplifiers similar to those described above, except larger. Two of these are used in negative feedback circuits to compare their own load voltage with that of a low power, constant voltage reference source. Since the magnetic amplifier may be fully actuated by 20 mv., for example, on its control coil, the output would be held equal to the reference source, to that tolerance.

The summing amplifier (Fig. 5) and the logarithmic network (Fig. 6), together with a plus and minus voltage reference source, can be interconnected to solve systems of non-linear algebraic equations. Trigonometric and other reasonable functions can also be introduced by shaping networks similar to the logarithmic ones described. The end result is a computer without vacuum tubes which has a high density of equations solved per unit volume; a high degree of reliability if attention is paid to manufacturing detail; low power consumption and heat dissipation; and a respectable degree of accuracy.

As a result of using logarithms for computing, the sources of error tend to affect the output by a fixed percentage of its value. This should be contrasted with the errors of most other computing schemes, which tend to have errors which are a given percentage of the full scale output value. Consequently, errors are most often quoted in terms of percent of full scale.

The errors of the logarithmic scheme described, depend upon the particular circuit under consideration. They are usually about one percent of the output value, for each operation performed by the components described above.

Obviously, many modifications and variations of the present invention are possible in the light of the above teachings. It is therefore to be understood that within the scope of the appended claims the invention may be practiced otherwise than as specifically described.

What is claimed is:

1. An analog computer which permits four quadrant multiplication comprising a first magnetic amplifier, a second magnetic amplifier, a third magnetic amplifier, each magnetic amplifier having a feedback circuit, a first logarithmic network, a second logarithmic network, and a third logarithmic network; each of said magnetic amplifiers and their respective logarithmic networks being capable of single polarity operation only; a first signal which may change polarity applied to the input of said first magnetic amplifier and a second signal which may change polarity applied to the input of said second magnetic amplifier, a signal which is a constant added to each of said first and second input signals to insure that the summation of each said input signal and said constant will always be of single polarity, said first logarithmic network connected to the output of said first magnetic amplifier, said second logarithmic network connected to the output of said second magnetic amplifier, the logarithmic output of said first logarithmic network and the logarithmic output of said second logarithmic network being applied to the input of said third magnetic amplifier, said third logarithmic network connected to the feedback circuit of said third magnetic amplifier; the signal output of said third magnetic amplifier being a quantity equal to a constant plus the input signal applied to said first magnetic amplifier multiplied by the input signal applied to said second magnetic amplifier.

2. An analog computer for four quadrant multiplication comprising first, second and third amplifiers, and first, second and third logarithmic networks; each said logarithmic network comprising an input terminal, a plurality of diodes each having one side thereof connected to said input terminal, an equal number of precision resistors as there are diodes, each diode having one end of a precision resistor connected to the other side thereof, a plurality of bias resistors equalling in number to one more than the number of precision resistors, said bias resistors connected in series to form a string, one end of said string adapted to have a source of bias voltage applied thereto, the other end of said string adapted to be connected to an output terminal, the other end of each precision resistor being connected to a different terminal between the bias resistors in said series string, and a resistor connected between said input terminal and a point of zero potential; said first and second logarithmic networks having the cathode of each of the diodes connected to the input terminal and the anode of each of the diodes connected to a precision resistor, said third logarithmic network having the anode of each diode connected to the input terminal and the cathode of each diode connected to a precision resistor, the source of bias voltage applied to said first and second logarithmic networks being positive and the source of bias voltage applied to said third logarithmic network being negative, each of said amplifiers and logarithmic networks being capable of single polarity operation only; a first signal which may change polarity applied to the input of said first amplifier, a second signal which may change polarity applied to the input of said second amplifier, and a signal which is a constant added to each said input signal to insure that the summation of each said input signal and said constant will always be of single polarity, the input of said first logarithmic network being connected to the output of said first amplifier, the input of said second logarithmic network being connected to the output of said second amplifier, the logarithmic output of said first and second logarithmic networks being connected to the input of said third amplifier, said third logarithmic network connected to the feedback circuit of said third amplifier, the signal output of said third amplifier being a quantity equal to a constant plus the input signal applied to said first amplifier multiplied by the input signal applied to said second amplifier.

3. A four quadrant computer comprising a first, second, and third magnetic amplifier each having a feedback circuit and a first, second and third logarithmic network; each said logarithmic network comprising an input terminal, a plurality of diodes each having one side thereof connected to said input terminal, an equal number of precision resistors as there are diodes, each diode having one end of a precision resistor connected to the other side thereof, a plurality of bias resistors equalling in number to one more than the number of precision resistors, said bias resistors connected in series to form a string, one end of said string adapted to have a source of bias voltage applied thereto, the other end of said string adapted to be connected to an output terminal, the other end of each precision resistor being connected to a different terminal between the bias resistors in said series string, and a resistor connected between said input terminal and a point of zero potential; said first and second logarithmic networks having the cathode of each of the diodes connected to the input terminal and the anode of each of the diodes connected to a precision resistor, said third logarithmic network having the anode of each diode connected to the input terminal and the cathode of each diode connected to a precision resistor, the source of bias voltage applied to said first and second logarithmic networks being positive and the source of bias voltage applied to said third logarithmic network being negative, each of said amplifiers and logarithmic networks being capable of single polarity operation only;

a first signal which may change polarity applied to the input of said first magnetic amplifier, a second signal which may change polarity applied to the input of said second magnetic amplifier and a signal which is a constant added to each of said input signals to insure that the summation of each said input signal and constant will always be of single polarity, the output of said first magnetic amplifier connected to the input of said first logarithmic network, the output of said second magnetic amplifier connected to the input of said second logarithmic network, the logarithmic output of said first and second logarithmic networks being applied to the input of said third magnetic amplifier, said third logarithmic network connected to the feedback circuit of said third magnetic amplifier, said third magnetic amplifier producing an output equal to the product of input signals applied to said first and second magnetic amplifiers.

References Cited in the file of this patent

UNITED STATES PATENTS

| | | |
|---|---|---|
| 2,574,438 | Rossi et al | Nov. 6, 1951 |
| 2,663,832 | McDonald et al. | Dec. 22, 1953 |
| 2,747,796 | Patterson | May 29, 1956 |
| 2,810,519 | Creusere | Oct. 22, 1957 |

OTHER REFERENCES

The Review of Scientific Instruments (Ragazzini), July 1953, pages 523 to 527.

Univ. of Conn. Engineering Experiment Station (Robb et al.), 1953, pages 10–16.

IRE Transactions, Electronic Computers (Savant), September 1954, pages 34 to 38.